United States Patent
Dimanshteyn

(10) Patent No.: US 10,919,266 B1
(45) Date of Patent: Feb. 16, 2021

(54) METHOD FOR PROTECTION FROM EXPLOSION AND FIRE

(71) Applicant: Felix A Dimanshteyn, West Hartford, CT (US)

(72) Inventor: Felix A Dimanshteyn, West Hartford, CT (US)

( * ) Notice: Subject to any disclaimer, the term of this patent is extended or adjusted under 35 U.S.C. 154(b) by 0 days.

(21) Appl. No.: 16/730,303

(22) Filed: Dec. 30, 2019

Related U.S. Application Data

(63) Continuation of application No. 15/477,512, filed on Apr. 3, 2017, now Pat. No. 10,280,118.

(51) Int. Cl.
*B32B 9/04* (2006.01)
*C09K 21/02* (2006.01)

(52) U.S. Cl.
CPC ............... *B32B 9/04* (2013.01); *C09K 21/02* (2013.01)

(58) Field of Classification Search
CPC .................................. B32B 9/04; C09K 21/02
See application file for complete search history.

(56) References Cited

U.S. PATENT DOCUMENTS

| | | | | |
|---|---|---|---|---|
| 3,833,064 A | * | 9/1974 | Ranney, Jr. ............ | A62C 19/00 169/52 |
| 5,377,577 A | * | 1/1995 | Bounkong ................ | F41H 5/08 2/2.5 |
| 5,441,114 A | * | 8/1995 | Spector .................. | A62C 5/006 169/14 |
| 6,318,473 B1 | * | 11/2001 | Bartley .................. | A62C 3/025 169/26 |

* cited by examiner

*Primary Examiner* — Aileen B Felton
(74) *Attorney, Agent, or Firm* — Robert S. Smith

(57) ABSTRACT

An explosion protection system comprises the steps of providing a fire extinguishing chemicals which under heat from explosion will decompose to absorb heat and releasing fire extinguishing gases which create a gas barrier against explosion; providing blast suppression chemicals which provide attenuation of shock resulting from an explosion; and providing a reinforcement layer on the object to be protected, the reinforcement layer providing impact and tensile strength materials and supporting the fire extinguishing chemicals and blast suppression chemicals including means for blocking gases released by an explosion.

1 Claim, No Drawings

METHOD FOR PROTECTION FROM EXPLOSION AND FIRE

TECHNICAL FIELD

The present invention is generally directed to methods and apparatus for the protection of apparatus and structures from damage that is the consequence of explosion and fire.

BACKGROUND OF THE INVENTION

As readily apparent, intentionally caused explosion(s) followed by fire resulting in the combustion of flammable materials results in substantial damage. Particularly concerning, for example, are explosions and fires at energy facilities, military structures and construction, oil and gas production facilities and transportation facilities including pipelines and tankers, vehicles of all kinds, as well as other strategic structures and construction.

Explosions, for example, of oil facilities including refinery explosions and resulting fires can disrupt the economy of part of a country or even world economies. Recent explosions in Saudi Arabia, as reported, have substantially disrupted the supply of oil was created by only 1.5 lb. of explosive and dropped from a drone.

Blast energy from the explosion impacts the surrounding area typically in a manner governed inversely by the square of the distance from the explosion.

From the above, it is therefore seen that there exists a need in the art to overcome the deficiencies and limitations described herein and above.

SUMMARY OF THE INVENTION

The shortcomings of the prior art are overcome and additional advantages are provided through an explosion protection system comprised steps of providing fire extinguishing chemicals which provide extinguishing fires from explosion which under heat from explosion will decompose absorbing heat and releasing fire extinguishing gases which create a gas barrier against explosion; providing blast suppression chemicals which provide attenuation of shock resulting from an explosion; and providing a reinforcement layer on the object to be protected, the reinforcement layer providing impact and tensile strength materials and supporting the fire extinguishing chemicals and blast suppression chemicals including means for blocking gases released by an explosion.

The method may use a reinforcement layer that comprises one or more materials selected from the group consisting of Spectra-shields, Kevlar, glass and carbon fibers, glass fabric, plastic screen, metals, and concrete. The reinforcement layers may include a binder selected from the group consisting of epoxy and polyester. The fire extinguishing chemicals may be selected from the group consisting of mono-ammonia and di-ammonia phosphate, ammonia sulfate, sodium bicarbonate, potassium bicarbonate, borates including borax, alumina trihydrate, Fyrol®, phosphorous compounds, and halogenated compounds. In some embodiments, the blast suppression chemicals are selected from the group consisting of precipitated silica, fumed alumina and fumed silica.

Some embodiments have the fire extinguishing chemicals disposed in one or more containers which fully cover a surface to be protected. The containers may be selected one or more containers selected from the group consisting of boxes, bags, polymer tubing. The reinforcement layers may be proximate to and surround the surface to be protected. The blast suppression chemicals may surround the reinforcement layers, and the fire extinguishing chemicals may surround the blast suppression chemicals.

Other embodiments provide an explosion protection system for protection against incoming projectiles include the steps of providing fire extinguishing chemicals which under heat from an explosion will decompose absorbing heat and releasing fire extinguishing gases to creates a gas barrier against explosion; providing a reinforcement layer on the object to be protected, the reinforcement layer providing impact and tensile strength materials and supporting the fire extinguishing chemicals and blast suppression chemicals including means for blocking gases released by an explosion; providing blast suppression chemicals which provide attenuation of shock resulting from an explosion; positioning the fire extinguishing chemicals and blast suppression chemicals proximate to an object to be protected; providing barriers around the fire extinguishing chemicals and blast suppression chemicals to initiate explosion of incoming projectiles missiles above the blast suppression chemicals. The barriers may be made from reinforced concrete and metal.

Still another embodiment includes a method for extinguishing a fire which includes providing at least one container filled with fire extinguishing chemicals, providing an explosive proximate to the container; and distributing the fire extinguishing chemicals using blast energy of explosion by initiating the explosion delivers fire extinguishing chemicals to fire. The fire extinguishing chemicals are selected from the group consisting of mono-ammonia and di-ammonia phosphate, ammonia sulfate, sodium bicarbonate, potassium bicarbonate borates such as borax, alumina trihydrate, Fyrol, phosphorus compounds, and halogenated compounds. The explosive maybe a hand grenade. The term "proximate to the container" as used herein includes placement either within or outside of the container.

Still another embodiment includes the method for extinguishing a fire which comprises providing at least one container having at least a part thereof constructed to soften and break in the presence of fire and filled with fire extinguishing chemicals and pressurized gasses whereby the container in the presence of fire will lose its strength and break to release the fire extinguishing chemicals. This method may utilize fire extinguishing chemicals that are selected from the group consisting of mono-ammonia and di-ammonia phosphate, ammonia sulfate, sodium bicarbonate, potassium bicarbonate borates such as borax, alumina trihydrate, Fyrol, phosphorus compounds, and halogenated compounds.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

DETAILED DESCRIPTION

The method in accordance with embodiments of the present invention utilizes anti-explosion protection that utilizes chemicals which in response to heat from the explosion will decompose absorbing heat and releasing fire extinguishing gases which create a gas barrier to oxygen and thus reduce the blast energy of the explosion.

Fire extinguishing chemicals utilized in embodiments of the present invention include mono-ammonia and di-ammonia phosphate, ammonia sulfate as well as sodium bicarbonate, potassium bicarbonate, borates such as borax, alumina trihydrate.

Chemicals that will attenuate blast also referred to herein as blast suppression chemicals include precipitated silica, fumed silica, and fumed alumina.

Embodiments of the present invention employ layers covering the chemicals referred to above with very high impact and tensile strength materials, which support the chemicals which function to block gases released by an explosion and attenuating blast energy.

The covering for the chemicals referred to above will in some embodiments include panels or blankets. The composition of such a panel comprises fire extinguishing chemicals that under heat will decompose absorbing heat and releasing gases which creates a gas barrier against explosion. The panel also comprised of blast suppression chemicals and reinforcement layers with very high impact and tensile strength materials, which support chemicals, block released gases and attenuate blast energy.

The fire extinguishing chemical can be used can be selected from the group consisting of mono-ammonia and di-ammonia phosphate, ammonia sulfate and other, sodium bicarbonate, potassium bicarbonate, borates such as borax, alumina trihydrate, Fyrol® (a chemical flame retardant, registered trademark owned by Stauffer Chemical Company a corporation of Delaware having an address in Westport Conn. 06880), phosphorus compounds and halogenated compounds Blast suppression chemicals used in the method in accordance with the present invention are selected from the group including precipitated silica, fumed silica, and fumed alumina.

A reinforcement layer with very high impact and tensile strength materials, support the chemicals referred to above that block gases released by an explosion and attenuate blast energy. The layers are composed of materials selected from the group consisting of Spectra Shields®, Kevlar®, glass and carbon fibers, glass fabric, plastic screen, plastic fabric, metals, and concrete. The term Spectra Shield® will be understood to refer to a spray-on polymeric lining system distributed by CCI Spectrum, LLC, 4527 Sunbeam Road, Jacksonville, Fla. 32257. The term Kevlar® will be understood to be a heat-resistant and strong synthetic fiber, related to other aramids. The trademark is owned by E. I. du Pont de Nemours and Company.

The glass fibers may be randomly arranged, flattened into a sheet (called a chopped strand mat), or woven into a fabric. The plastic matrix may be a thermoset polymer matrix, often based on thermosetting polymers such as epoxy, polyester resin, or vinyl ester or a thermoplastic. Fiberglass is cheaper and more flexible than carbon fiber, stronger than many metals by weight, and is non-magnetic, non-conductive, transparent to electromagnetic radiation, and can be molded into complex shapes, and is chemically inert under many circumstances.

Applications include aircraft, boats, automobiles, bathtubs and enclosures, swimming pools, hot tubs, septic tanks, water tanks, roofing, pipes, cladding, orthopedic casts, surfboards, and external door skins.

These very high impact and tensile strength materials will be reinforced in some embodiments of the present invention.

The reinforcement can be used coatings with a strong binder such as epoxy and/or polyester and reinforcement Alternatively, instead of the panels described above, the object being protected may be covered by a blanket. Embodiments utilizing a blanket instead of one or more panels utilize one or more blankets that have basically the same formulation as the panels, however, they are flexible. Blankets can be made flexible enough for wrapping surfaces such as oil pipelines.

The composition of blankets comprises fire extinguishing chemicals that under heat will decompose absorbing heat and releasing gases which creates a gas barrier against explosion. Blankets also comprise blast suppression chemicals.

One or more fire extinguishing chemical can be used selected from the following the group consisting of mono-ammonia and di-ammonia phosphate, ammonia sulfate and other, sodium bicarbonate, potassium bicarbonate, borates such as borax, alumina trihydrate, Fyrol® (a chemical flame retardant, registered trademark owned by Stauffer Chemical Company a corporation of Delaware having an address in Westport Conn. 06880), phosphorus compounds and halogenated compounds.

Blast suppression chemicals can be used precipitated silica, fumed silica, and fumed alumina.

Reinforcement layers with very high impact and tensile strength materials, which support chemicals, block released gases and attenuate blast energy Different materials can be used for the reinforcement layer however, they may be selected from the group consisting of Spectra-shields®, Kevlar®, glass and carbon fibers, glass fabric, plastic screen, concrete.

These materials can be reinforced. The reinforcement can be one or more coatings with a strong binder such as epoxy and/or polyester and reinforcement fibers. Similarly, the coating can be used for protection material and extinguishing fire. For example, wood boxes that store flammable chemicals can be treated with chemicals that will prevent fire.

In another embodiment, fire extinguishing chemicals can be used for extinguishing a fire. They can be delivered to the fire by an explosion blast. Following the occurrence of an explosion, it is desirable to extinguish heat energy from the explosion and use blast energy to deliver retardant chemicals to extinguish the fire. This approach can be used for extinguishing large fires such as forest fires, oil, and gasoline production facilities, energy facilities, petrochemical plants.

In these cases, drums, totes or any containers filled with fire retardant chemicals. Inside of containers should be placed an explosive covered with an anti-explosive blanket. The blanket absorbs the energy of fire and heat. The blast energy will deliver fire retardant chemicals to a fire and extinguish the fire.

In another embodiment, the explosion for delivering fire extinguishing chemicals to fire can be a grenade. The grenade may be positioned inside of one or more containers covered with an anti-explosive blanket. The blanket absorbs the energy of fire and heat. The blast energy will deliver fire retardant chemicals to fire and extinguish it. These grenades can be thrown to the fire even by robots.

In another embodiment, chemicals can be placed in a container under high pressure. These containers will be dropped on any consequent fire. Under the heat, such containers will lose strengths and physical integrity whereby the container will break and release gases under high pressure and extinguishing fires.

Fire extinguishing chemicals can be placed in boxes. These boxes can be made any size to cover the surface which needs to be protected. The amount of chemicals will be determined by the amount of explosives.

Large boxes should be divided into small sections to provide equal distribution of chemicals. Such boxes may be made from materials selected from the group consisting of paperboard, cardboard, plastic and other know materials.

Fire extinguishing chemicals are placed in polymer tubing in other embodiments of the invention. In some embodiments polymer tubing containing extinguishing chemicals is wrapped around a surface to be protected. For example, wrapped around an oil pipe.

Based on the results of all types of explosion tests conducted with a panel in accordance with the present invention no fire from explosion was detected. That can be explained by the following:

When an explosion occurs, part of the energy released is thermal energy that causes fires. With the present invention, this energy is absorbed by surrounding chemicals. in the process of decomposition of these surrounding chemicals. In the process of decomposition of the surrounding chemicals, an additional effect is the release of non-flammable gases that create a barrier for oxygen and reducing blast energy.

When an explosion occurs, the released thermal energy can have a substantial effect on surrounding areas particularly if these areas have very flammable materials such as chemical plants, oil, and gas production facilities, electric power plants or any other flammable facilities. It is particularly significant that a relatively small amount of explosives can create an additional distraction to local personnel as well as a major disruption in energy or electricity supply.

A prior report issued by the Battelle Institute evaluated a prototype thermal and ballistic material in accordance with the present invention. The composition of the prototype material was not made public at any time prior to the filing of this patent application. The report is captioned "FINAL REPORT FOR OST TASK 35; Preliminary Evaluation of Prototype Thermal and Ballistic Attenuation Materials" and was directed to the Office of Special Technology; 10530 Riverview Drive: Fort Washington, Md. 20744. The report was dated December 1994 and identified Contract No. DAAD05-93-D-702i The report stated: The materials performed well in terms of explosive energy absorption which was in the form of blast overpressure and light emission. These measured quantities may have also been less than representative of the true potential due to sample tailoring for by blast. The performance of the sample materials was better than rubber which is an absorber of energy in the tms of tests conducted.

Although not intentionally, the samples were robust and demonstrated an ability to survive the blast loading in relatively small sample sizes. As intended by TRI, some of the were constructed with emphasis on non-perforation by blast. These were not by the blast which indicates that some of the materials have the ability to either distribute the explosive loading and/or are of extremely high tensile strength.

The following lists the most significant results witnessed for the materials evaluated in each test type:

Heat Attenuation—The temperature output of 17.9 gm explosive charge was lowered from approximately 464 to 235 degrees F. with a sample weight of 86.5 gm. The heat absorbed initially was later redistributed to the gas in the calorimeter.

Shock Attenuation—The samples reduced the shock from a 41 gm explosive charge from approximately 180 to 8 kbar for a sample thickness of 1.625 inches. Neoprene reduced the shock amplitude to approximately 60 kbar in a 1.25 inch thickness.

Overpressure Attenuation—Side-on and reflected overpressures from a 41 gm explosive charge were with a gm sample by approximately 60-70% and 57% respectively. Neoprene at weight reduced side-on overpressure by approximately 61% and overpressure by 50%.

Light Emission Attenuation—A 700 gm sample essentially stopped all light emission from a 41 gm explosive charge.

Ballistic Attenuation—Several 7.62 mm armor piercing projectiles with velocities of 2700 ft/s were stopped with 0.75 inch thick panels with areal densities of 7.7 psf.

It will be understood by those skilled in the art that the heat attenuation in an open space distributes the heat into space.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "an imager" should typically be interpreted to mean "at least one imager"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "two images," or "a plurality of images," without other modifiers, typically means at least two images). Furthermore, in those instances where a phrase such as "at least one of A, B, and C," "at least one of A, B, or C," or "an [item] selected from the group consisting of A, B, and C," is used, in general, such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms.

For example, the phrase "A or B" will be understood to include the possibilities of "A" or "B" or "A and B."

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described in terms of various specific embodiments, those skilled in the art will recognize that the invention can be practiced with modification within the spirit and scope of the claims.

What is claimed is:

1. A method for extinguishing a fire which comprises:
providing at least one container filled with fire extinguishing chemicals;
providing an explosive proximate to the container,
whereby the fire extinguishing chemicals are propelled by the blast energy of the explosion to extinguish the fire and
wherein the step of providing an explosive proximate to the container further includes the step of covering the explosive with an anti-explosive blanket that in response to heat will decompose to absorb the energy of fire and heat and extinguish the fire.

* * * * *